April 14, 1931.    C. L. DELACHAUX    1,800,440
SUPPORT FOR OVERHEAD WIRES FOR RAILWAYS, TRAMWAYS, AND THE LIKE
Filed Aug. 21, 1930    2 Sheets-Sheet 1
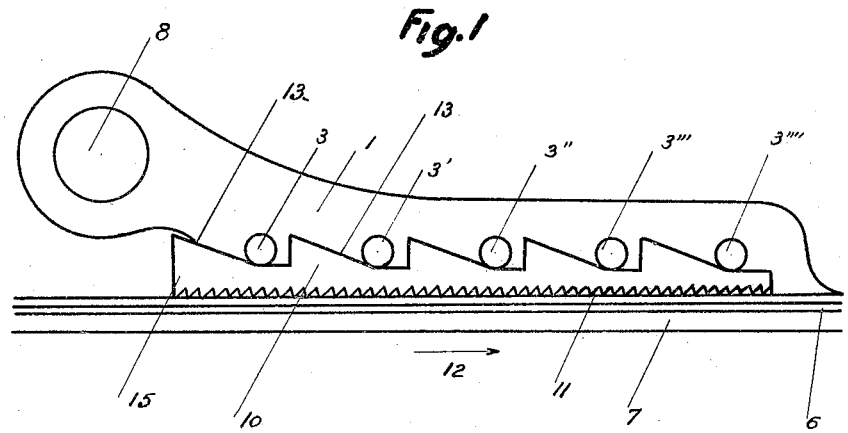
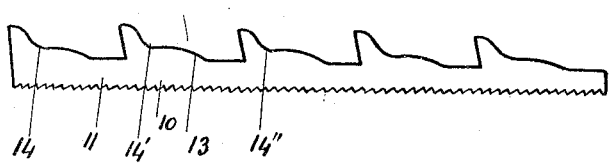
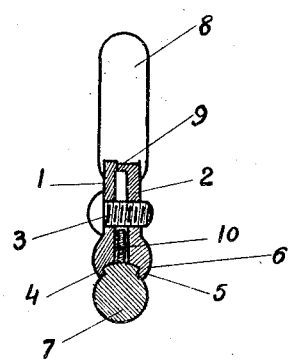
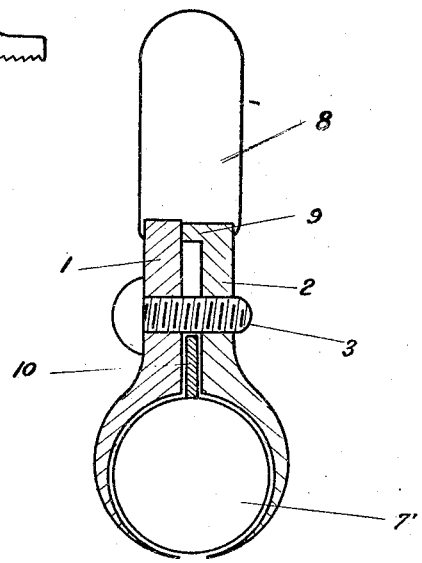
C. L. Delachaux
INVENTOR
By Marks & Clerk
Attys.

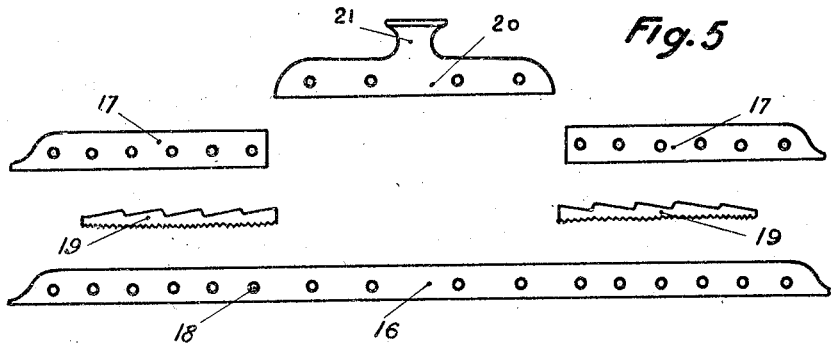
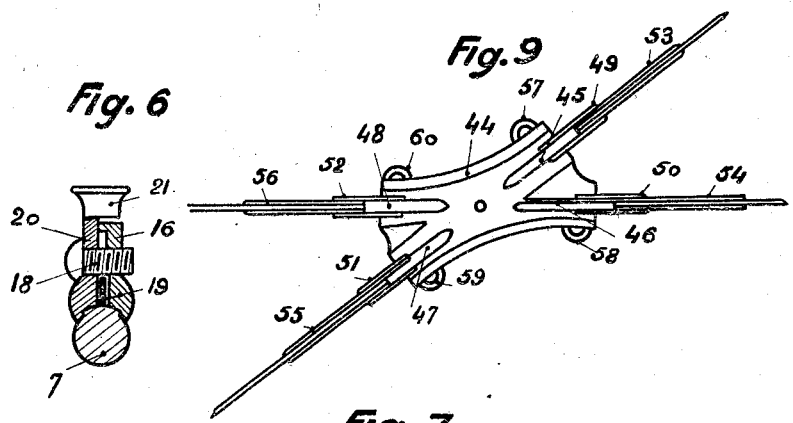
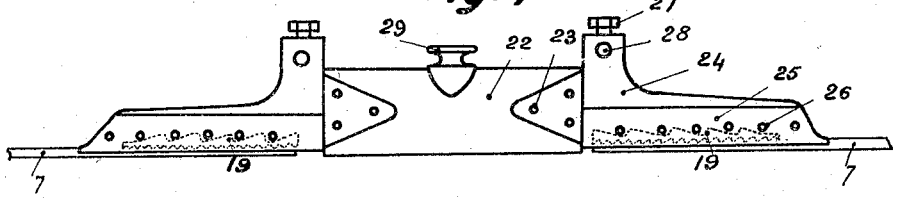
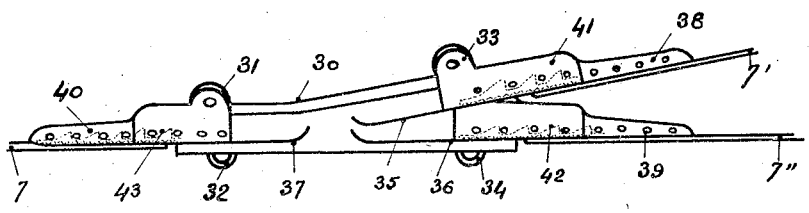

Patented Apr. 14, 1931                                1,800,440

UNITED STATES PATENT OFFICE

CLARENCE LÉON DELACHAUX, OF GENNEVILLIERS, FRANCE, ASSIGNOR TO ACIERIES DE GENNEVILLIERS, ANCIENS ETABLISSEMENTS C. DELACHAUX, OF GENNEVILLIERS, FRANCE, A COMPANY OF FRANCE

SUPPORT FOR OVERHEAD WIRES FOR RAILWAYS, TRAMWAYS, AND THE LIKE

Application filed August 21, 1930, Serial No. 476,904, and in France August 28, 1929.

It is well known that the overhead wires of tramways and electric railways exert considerable tractional stresses on their anchoring points which it has not been possible heretofore to design in a manner such as will allow them to properly resist these stresses.

An arrangement proposed for these anchoring points consisted of two clutch elements secured together by means of screws and between which is held the end of the wire generally provided on either side with a shoulder engaged on its underside by a projection of the clutch element. Now experience has shown that these elements slide over the wire for tensions lower than those which are usual in practice.

My invention has for its object an anchoring means of this type wherein this drawback is removed through an effective anchoring of the wire, even with the most considerable tensions used.

It consists chiefly in interposing between the clutch elements a toothed part the teeth of which engage the wire whereby the contact and anchoring are provided through a plurality of points. This toothed part bears on the other hand against the stationary parts of the clutch through suitable slopes whereby any sliding motion of the wire inside the clutch carries along the toothed part and urges the slopes against said stationary parts whereby the teeth are caused to engage the wire and to hold it stationary.

Moreover the toothed part is thin (about 1.5 m/m thick) and of soft metal whereby for a given tension, the toothed part is deformed at the points where it is in contact with the stationary parts.

My improved arrangement may be used not only with wires having longitudinal shoulders but also with any type of wire. In the case of a round wire or cable, the latter is surrounded by two flanges as shown in Figure 4. My invention may also be used for applications other than anchoring such as for supports, for connections, section insulators, at junctions, crossings and the like. Obviously I do not mean to restrict the application of my invention otherwise than by the wording of the appended claims.

I have illustrated by way of example several forms of execution of my invention in accompanying drawings.

Figures 1, 2 and 3 show the invention as applied to anchoring means, Figure 1 being a side view partly sectional of the arrangement, Figure 2 a cross section and Figure 3 showing the toothed or serrated cam after a traction has been exerted on the wire.

Figure 4 illustrates the invention as applied to a round wire or cable without any shoulder.

Figures 5 and 6 show it as applied to a connection between two wires, Figure 5 showing the several parts apart and Figure 6 being a cross-section of the assembly thereof.

Figure 7 is a side view of the device applied to a section insulator.

Figure 8 is a perspective view of an aerial junction to which the device has been applied.

In the anchoring device shown in Figures 1 and 2, the clutch comprises in the usual manner two comparatively long jaw elements 1 and 2 which are secured together through the screws 3, 3', 3'', 3''', 3''''. These jaws show each at their lower end a longitudinal flange 4—5 engaging respectively one of the longitudinal recesses 6 provided underneath the shoulders of the wire or cable 7 to be anchored at the point considered. One of the jaws 1 for instance ends with an eye 8 serving to secure the arrangement to a suitable stationary point.

In order to space the lower end of the jaws apart, one of the jaws, say 2, is provided at its upper end throughout its length or from place to place with an inner flange 9 adapted to bear against the other jaw (Figure 2).

According to my invention, I dispose between the two jaws a wedge-shaped part 10 the lower side of which is provided with teeth 11 similar to those of a saw and directed against the direction of the traction exerted on the wire 7 as illustrated by the arrow 12 of Figure 1. This serrated wedge 10 is of soft metal and very thin (about 1.5 m/m).

The side of the part 10 opposed to the saw teeth shows a series of slopes 13 each bearing against one of the screws 3 securing the two jaws together or against any suitable stationary point.

The working is as follows: the shoulder of the wire 7 being engaged in contact with the flanges 4—5 of the jaws 1—2 when the wire exerts a traction in the direction of the arrow 12, the part 10 is carried along by the wire whereby its sloping surfaces are caused to bear against the screws 3. Under the action of the stresses arising thereby, the teeth engage the wire material and when their entire height has entered the wire, part 10 is deformed (Figure 3), the screws 3, 3′ nesting in the notches 14, 14′ which they form in said part 10. The effort exerted at the bottom of these notches increases the hooking action of the cam on the screws and diminishes the downwardly directed action on the wire which is thus held securely. The serrated part 10 projects slightly to the rear 15 of the jaws whereby a slight hammer blow allows the engagement with the screws to be initiated.

Figure 4 illustrates a modification applicable to the case of a round wire having no shoulders or of a cable 7′; the jaws 1 and 2 are provided with incurved extensions surrounding almost entirely the wire or cable.

The splicing ear shown in Figures 5 and 6 comprises a steel part 16 to each end of which is secured a small plate 17 through the agency of a number of fastening screws 18, say six. According to my invention, I dispose between the part 16 and each plate 17 a serrated part 19 provided for instance with five slopes adapted to bear against five screws 18, the last or sixth screw serving only for fastening the part 16 to the corresponding plate 17, so as to prevent the stress produced by the serrated part at the end of the splicing ear from initiating a breaking of the wire, which breaking would be comparatively easy owing to the oscillations of the wire if it were to be secured at the very end of the stationary aerial devices. Of course the two serrated parts are disposed in opposed directions so as to resist the tractional stresses of the two wire strands 7. The splicing ear is completed by a part 20, which is provided with a knob 21, serves for hanging the device and is secured to the central portion of part 16.

Figure 7 shows the device as applied to a section insulator. This insulator comprises an insulating body 22 of rectangular shape to each end of which is secured through the bolts 23, a bronze part 24 extending outwardly as a small grooved plate cooperating with another small grooved plate 25 for holding tightly the wire 7; the plates are secured together through the agency of the screws 26. According to my invention, I dispose between each cooperating plates 24 and 25 a serrated part 19, suitably disposed for resisting the traction exerted by the wire.

A clamping screw 27 is adapted to secure the feed wire in an aperture 28 of the bronze part 24. A knob 29 secured to the middle of the insulating body 22 affords means for hanging the whole insulator assembly.

The aerial frog shown in Figure 8 comprises a main Y-shaped body 30 carrying four suspension eyes 31, 32, 33, 34 which allow the hooking on to transversal cables.

The body 30 shows three grooves 35, 36, 37 along which the trolley roller is adapted to run. These grooves stop slightly before the centre of the apparatus so as to allow the switching of the roller. To each end of the grooves is secured an anchoring device 38, 39, 40 comprising a serrated part secured to the body 30 by means of single or double plates such as 41, 42, 43. The ends of the wires 7, 7′, 7″ engage the inner ends of the grooves 35, 36, 37 so as to ensure the continuity of the passage of the roller.

Lastly, Figure 9 shows my invention as applied to an aerial crossing.

The latter is constituted by a main X-shaped body ending with four arms or grooved parts 45, 46, 47, 48 along which may run the trolley roller. The grooves stop slightly ahead of the centre of the main body so as to allow the roller to pass over either of the tracks provided. To the end of each of the four grooves is secured through the plates 49, 50, 51, 52 an anchoring device provided with a serrated part 53, 54, 55, 56 according to my invention. Four eyes 57, 58, 59, 60 allow the crossing to be hung by means of transversal cables.

In the case of a section insulator, of a frog or of a crossing, the serrated part should not be held by the outer clamping screw of the cooperating plates for the same reasons as for the splicing ears.

What I claim is—

1. An anchoring device for the aerial wires of railways, tramways and the like, comprising two jaws on either side of the wire and engaging same, screws adapted to secure said jaws together, a wedge-shaped thin serrated part of soft metal disposed between the jaws, the teeth of said serrated part engaging the wire, and means whereby said serrated part bears against parts of the jaws and screws assembly in a manner such that the wire, when submitted to a traction, forces the serrated part between the last mentioned parts and itself.

2. An anchoring device for the aerial wires of railways, tramways and the like, comprising two jaws on either side of the wire and engaging same, screws adapted to secure said jaws together, a wedge-shaped thin serrated part of soft metal disposed between the jaws, the teeth of said serrated part engaging the wire and sloping parts on the upper side of said serrated part, the sloping parts bearing against corresponding screws of the jaw-securing screws, the slopes being adapted to be deformed by the screws when the serrated part is forced between them and the wire through the traction exerted on the latter.

3. An anchoring device for the aerial wires of railways, tramways and the like, comprising two jaws on either side of the wire and engaging same, screws adapted to secure said jaws together, a wedge-shaped thin serrated part of soft metal disposed between the jaws, the teeth of said serrated part engaging the wire, an inner flange on one jaw adapted to bear against the other on the outside of the serrated part, and means whereby said serrated part bears against parts of the jaws and screws assembly in a manner such that the wire, when submitted to a traction, forces the serrated part between the last mentioned parts and itself.

4. An anchoring device for the aerial wires of railways, tramways and the like, comprising two jaws on either side of the wire and engaging same, screws adapted to secure said jaws together, a wedge-shaped thin serrated part of soft metal disposed between the jaws, the teeth of said serrated plate engaging the wire and sloping parts on the upper side of said serrated part adapted to bear against corresponding screws of the jaw-securing screws except the outer screw, the slopes being adapted to be deformed by the screws when the serrated part is forced between them and the wire through the traction exerted on the latter.

5. A splicing ear for connecting two aerial wires, comprising a base plate on one side of the two wires, two jaw plates cooperating with either end of the base plate, screws adapted to secure the jaw plates to the base plate, a wedge-shaped thin serrated part of soft metal disposed between the first plate and each jaw plate, the teeth of the serrated part engaging the corresponding wire and means whereby each serrated part bears against parts of the plates and screws assembly in a manner such that the wire, when submitted to a traction, forces the serrated part between the last mentioned parts and itself.

6. A section insulator for aerial wires, comprising an insulating body, a conducting plate at each end thereof adapted to receive the corresponding wire, a jaw plate cooperating with each conducting plate on the other side of the wire, screws adapted to secure jaw plates to the conducting plates, a wedge-shaped thin serrated part of soft metal disposed between the first plate and each jaw plate, the teeth of the serrated part engaging the corresponding wire and means whereby each serrated part bears against parts of the plates and screws assembly in a manner such that the wire, when submitted to a traction, forces the serrated part between the last mentioned parts and itself.

7. An aerial anchoring device for aerial wires, comprising a support, a plurality of grooved extensions for the ends of the wires, jaws secured to the outer end of said extensions, screws adapted to secure the corresponding jaw plates together, a wedge-shaped thin serrated part disposed between each pair of cooperating jaws, the teeth of said serrated part engaging the wire and means whereby said serrated part bears against parts of the jaws and screws assembly in a manner such that the wire, when submitted to a traction, forces the serrated part between last mentioned parts and itself.

8. An aerial crossing for aerial wires, comprising a support, four grooved extensions for the ends of the wires, jaws mounted on the outer end of said extensions, screws adapted to secure the corresponding jaw plates together, a wedge-shaped thin serrated part disposed between each pair of cooperating jaws, the teeth of said serrated part engaging the wire, and means whereby said serrated part bears against parts of the jaws and screws assembly in a manner such that the wire, when submitted to a traction, forces the serrated part between the last mentioned parts and itself.

In testimony whereof I affix my signature.

CLARENCE LEON DELACHAUX.